United States Patent
Choi et al.

[11] Patent Number: 5,940,299
[45] Date of Patent: *Aug. 17, 1999

[54] SYSTEM & METHOD FOR CONTROLLING A PROCESS-PERFORMING APPARATUS IN A SEMICONDUCTOR DEVICE-MANUFACTURING PROCESS

[75] Inventors: Sang-koog Choi; Jae-Kyung Lee; Sang-woon Kim, all of Suwon, Rep. of Korea

[73] Assignee: SamSung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,673

[22] Filed: Sep. 24, 1996

[30] Foreign Application Priority Data

Oct. 13, 1995 [KR] Rep. of Korea ........................ 95-35422

[51] Int. Cl.⁶ ............................ G06F 19/00; G06F 11/00; G06G 7/66; G01R 31/08
[52] U.S. Cl. ................. 364/468.28; 364/228; 364/228.1; 364/228.3; 395/846; 395/182; 371/32; 711/163
[58] Field of Search ............................ 364/468.28, 488, 364/468, 228; 437/8, 205; 414/217; 235/151.1; 395/846, 182; 371/32; 711/163

[56] References Cited

U.S. PATENT DOCUMENTS

| | | | |
|---|---|---|---|
| 3,845,286 | 10/1974 | Aronstein | 235/151.1 |
| 5,270,222 | 12/1993 | Moslehi | 437/8 |
| 5,355,320 | 10/1994 | Erjavic | 364/488 |
| 5,375,061 | 12/1994 | Hara | 364/468 |
| 5,399,531 | 3/1995 | Wu | 437/205 |
| 5,435,682 | 7/1995 | Crabb | 414/217 |
| 5,497,331 | 3/1996 | Iriki | 364/468 |

*Primary Examiner*—Reba I. Elmore
*Assistant Examiner*—Carolyn T. Baumgardner
*Attorney, Agent, or Firm*—Pillsbury Madison & Sutro LLP

[57] ABSTRACT

A control system of a semiconductor device manufacturing process is disclosed. The system includes a main host computer, host computers connected to the main host computer and process performing apparatuses connected to the host computers. The system checks the integrity of transferred operational instructions between the host computers and process performing apparatuses, in order to prevent errors in the manufacturing process. When the error is detected the system user is notified by audio signals or visual displays.

5 Claims, 4 Drawing Sheets

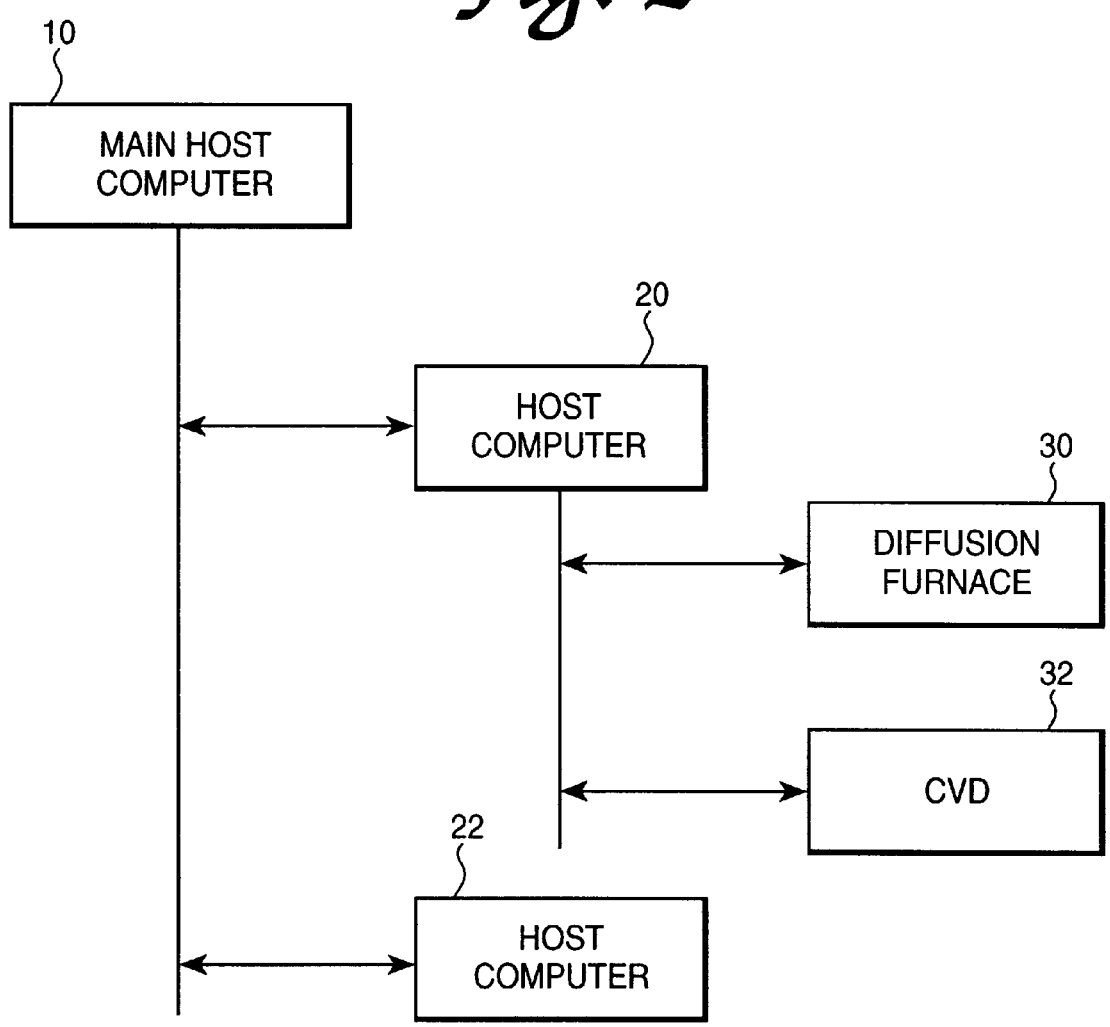

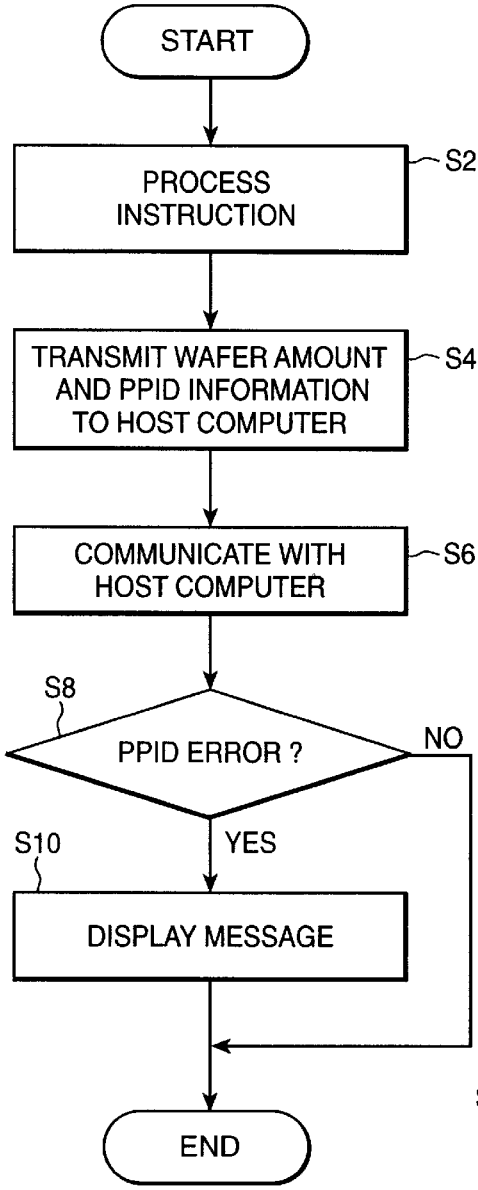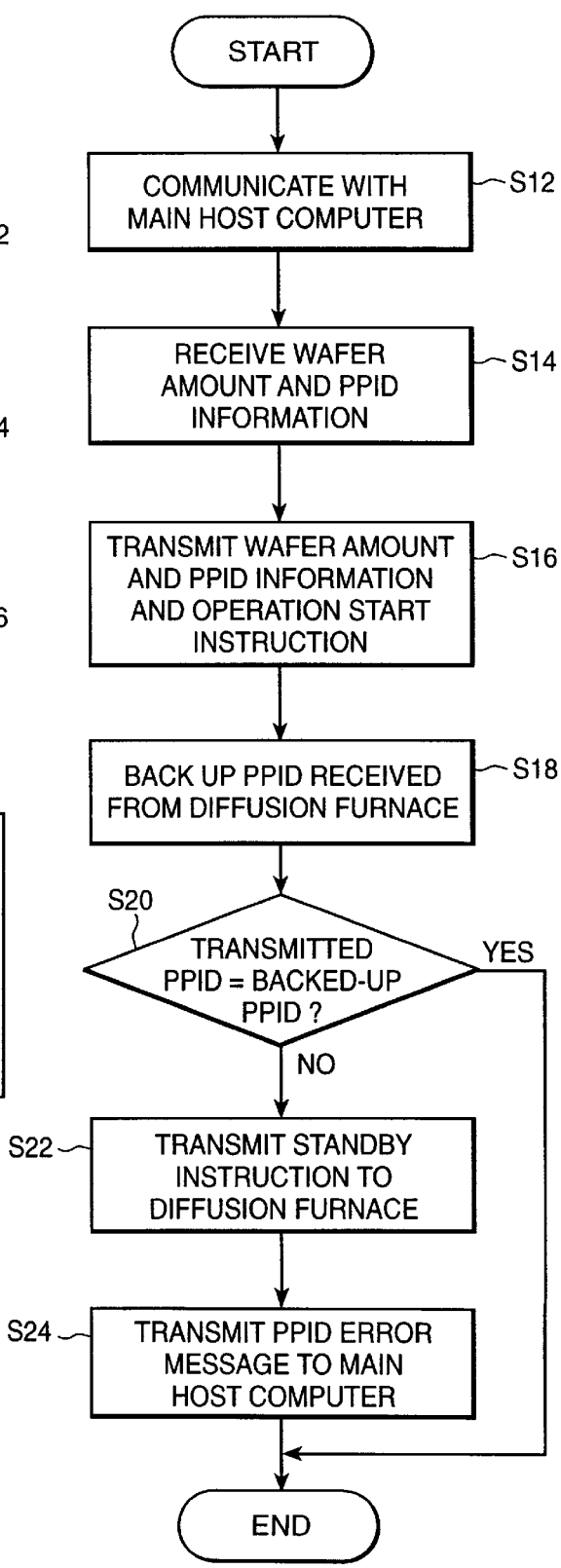

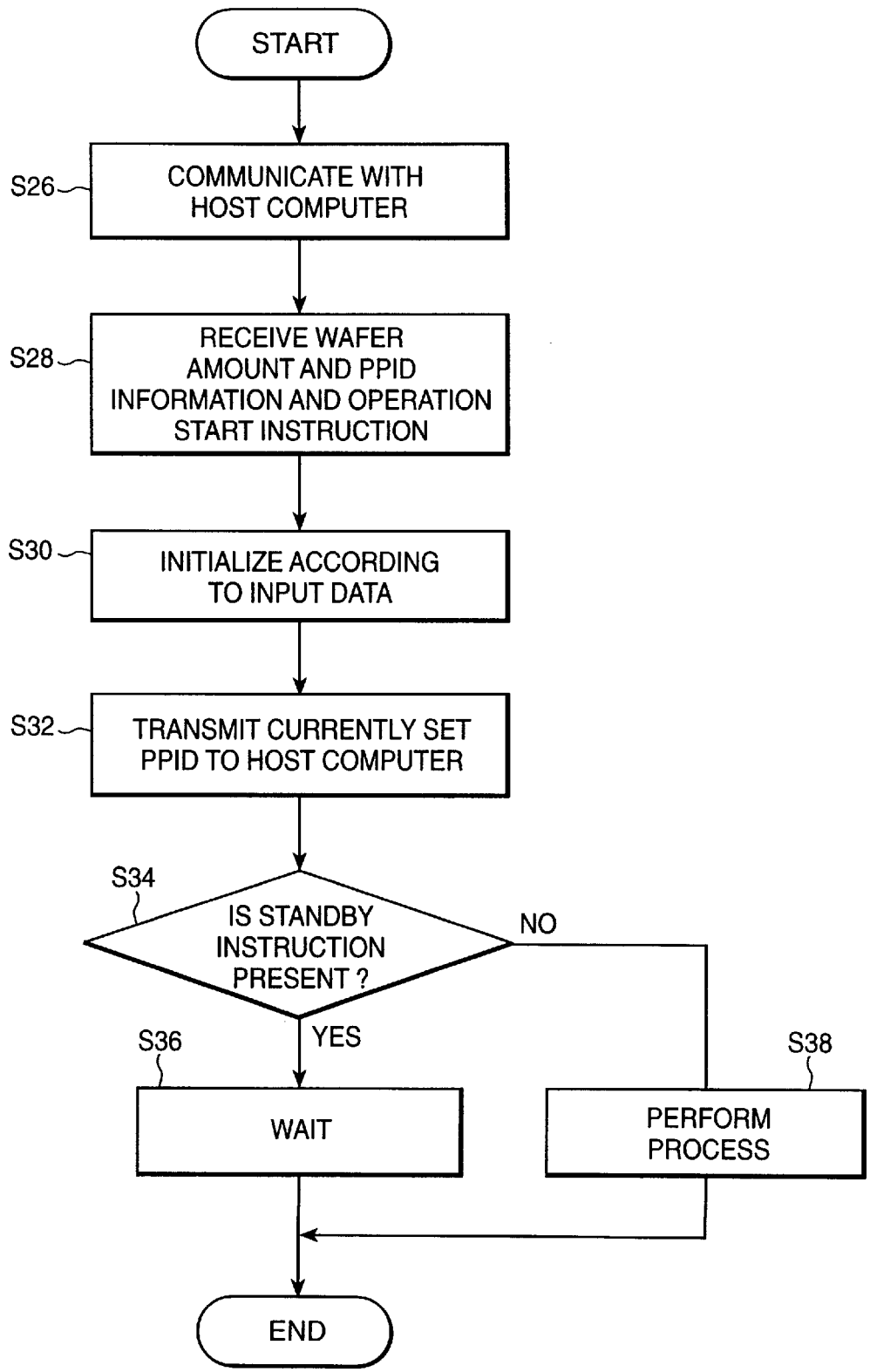

SYSTEM & METHOD FOR CONTROLLING A PROCESS-PERFORMING APPARATUS IN A SEMICONDUCTOR DEVICE-MANUFACTURING PROCESS

BACKGROUND OF THE INVENTION

The present invention relates to a control system for a semiconductor device manufacturing process and a method in which a semiconductor fabrication process program checks states set up in apparatuses required to perform the respective processes, to thereby prevent errors produced during the processes.

Generally, for the finish product, a semiconductor device passes through various processes such as mask fabrication, wafer fabrication, assembly and inspection. These processes require a variety of equipment such as digitizers, developers, diffusion furnaces, coaters, chemical vapor depositors (CVDs), automatic mounters, and testers.

These apparatuses are designed to operate under the control of a host computer. The host computer is connected to a main host computer, and receives information about the processes performed by the apparatuses, and program information from the main host computer. The apparatuses described above, for instance, the diffusion furnace or CVD, perform not only a single process but also a variety of processes modified therefrom.

It will be explained below that processes set up by different programs are carried out in a diffusion furnace (not shown).

The diffusion furnace is used to carry out diffusion, or oxidation in which an $SiO_2$ layer is formed on a silicon wafer. Especially, in the oxidation process, the oxide layer may be formed so as to be of different thicknesses, as required for the particular instances. Programs for controlling the process of forming an oxide layer of the respective thicknesses are used to control operation of the diffusion furnace.

In FIG. 1, a program for forming an oxide layer of 3,000 Å is designated PPID 1, and a program forming an oxide layer of 800Å is designated PPID 2. PPID acronym equating to process program identification. There are many process conditions which must be set up in the diffusion furnace in order to perform the oxidation in accordance with the aforementioned programs. For temperature and the amount of oxygen for diffusion, PPID 1 is designed to maintain a temperature of 1,000° C. and to supply of 8 l of oxygen process. In contrast, PPID 2 is designed to maintain a temperature of 900° C. and to supply 10 l of oxygen.

Program instructions to perform those processes are input to the main host computer (not shown) by a user, and transferred to the host computer (not shown) and are transferred then to the diffusion furnace. If the PPID information is input, the diffusion furnace confirms receipt of the input and performs a process according to a corresponding program. These processes in accordance with the respective PPID programs may be performed alternately in a single diffusion furnace, if necessary.

In carrying out the alternate processes, when information about PPID 1 is received from the host computer, the diffusion furnace sets its process conditions to a temperature of 1,000° C. and 8 l of oxygen, and then performs a process corresponding to PPID 1. After a process corresponding to PPID 1 has been performed, when information about PPID 2 is received from the host computer, a temperature of 900° C. and 10 l of oxygen are fixed for the diffusion furnace's conditions. With these conditions, a process corresponding to PPID 2 is carried out.

However, when the information about the program is transmitted from the host computer to the process-performing apparatus such as the diffusion furnace in order to conduct the process within one apparatus, the transmitted information is often not received correctly, or produces an error in the process-performing apparatus such as the diffusion furnace. As a result, the PPID may not be updated to reflect the desired change, e.g., from PPID 1 to PPID 2, so that the previous PPID process is performed again, instead of the intended next one.

In addition, due to problems of software set in the process performing apparatus, the transmitted PPID may not be recognized accurately and therefore the previous PPID process may be performed. Further, due to communication trouble, the transmitted information may be deformed and transferred in such a deformed state to the process-performing apparatus. In this case, process conversion may not be carried out.

Aside from the above cases, program information transferred to carry out a process may not be received correctly in the process-performing apparatus so that not a desired process but a mutant process is performed, deteriorating the quality of products.

In order to solve the problems described above, an operator in charge of corresponding equipment confirms information and program set in the process performing apparatus frequently in order to prevent process errors. However, this is not so efficient as to accurately check, and, thus, prevent the process errors.

SUMMARY OF THE INVENTION

It is an object of the present invention to provide a control system for a semiconductor device manufacturing process which, if process information transmitted to an apparatus is sent or recognized incorrectly, confirms this situation and interrupts the process.

It is another object of the present invention to provide a controlling method for a semiconductor device-manufacturing process which confirms program information set by an apparatus and then, if it is not set by a process instructed, interrupts the process.

It is still another object of the present invention to provide a controlling method for a semiconductor device-manufacturing process which, if a program set error is produced, displays a message to thereby allow an operator to notice the error.

To accomplish the object of the present invention, there is provided a control system for a semiconductor device manufacturing process, comprising: a main host computer for transmitting process program information and wafer-to-be-fabricated information when they are input; a host computer connected to the main host computer through data buses and for reading the program information and wafer information transmitted from the main host computer, to transfer the process program information and an operation start instruction, if the transferred process program information is backed up and received, and judging if the backed up process program information is identical to the transmitted process program information or not, to transfer a stand-by instruction when an error happens; and a process-performing apparatus connected to the host computer through data buses and for backing up the process program information to the host computer, if the operation start instruction and process program information are received from the host computer, and stopping operation if the operation stand-by instruction is received from the host computer.

For accomplishing the object of the present invention, there is further provided a method for controlling a semiconductor device-manufacturing system consisting of a main host computer, host computer and a process-performing apparatus, the method comprising the steps of: receiving process program and wafer-to-be-fabricated information by the host computer when a user inputs them to the main host computer, and thus transmitting an operation start instruction and the process program information to the process performing apparatus from the host computer; backing up the process program information from the process performing apparatus to the host computer; judging whether the backed up process program is identical to the transmitted process program or not in the host computer; and transmitting a stand-by instruction from the host computer if the backed up process program is different from the transmitted process program to stop the process performing apparatus, and allowing the process performing apparatus to continue its operation if the backed up process program is the same as the transmitted process program.

BRIEF DESCRIPTION OF THE DRAWINGS

FIG. 2 is a block diagram of one embodiment of a system for a semiconductor device-fabricating process according to the present invention;

FIG. 3 is a flowchart of an operation carried out in the main host computer of FIG. 2;

FIG. 4 is a flowchart of an operation carried out in the host computer of FIG. 2; and FIG. 5 is a flowchart of an operation carried out in the diffusion furnace of FIG. 2.

DETAILED DESCRIPTION OF A PREFERRED EMBODIMENT OF THE INVENTION

Figure 1:
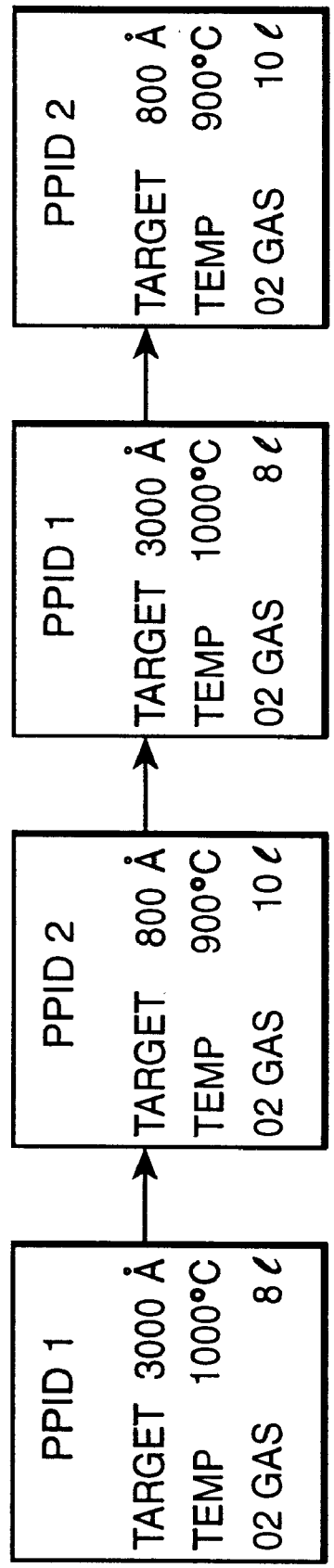
FIG. 1 is a process flow diagram which shows that processes set by different programs are alternately performed in a diffusion furnace.

A preferred embodiment of a control system for a semiconductor device-manufacturing process and method for controlling the same according to the present invention will be explained below with reference to the accompanying drawings.

Referring to FIG. 2, in a control system of semiconductor device-manufacturing process according to an embodiment of the present invention, a main host computer 10 is connected to host computers 20 and 22 via data buses, each host computer 20 or 22 being connected to a plurality of apparatuses, that is, process performing apparatuses such as a diffusion furnace 30 and a CVD 32, via data buses.

The main host computer 10 communicates a program and corresponding information with the host computer 20, to carry out individual process control operations for manufacturing the semiconductor devices. The host computer 20 controls that a predetermined process is performed in the individual process performing apparatuses on basis of information exchanged with the main host computer 10. Then, the apparatuses such as the diffusion furnace 30 and CVD apparatus 32 drive corresponding programs in accordance with information input from the host computer 20, out of the established programs, and perform respective predetermined processes.

In this embodiment of the present invention, the diffusion furnace 30 performs its process under the control of the main host computer 10 and host computer 20. However, the spirit and scope of this invention are not confined to those the details of the illustrated embodiment.

A variety of diffusion processes may be performed in the diffusion furnace 30 at different degrees of diffusion. In order to perform these processes, several programs are set up in the diffusion furnace 30 in advance. In other words, as shown in FIG. 1, programs for processes of forming the oxide layer so as to be of respective different thicknesses according to the diffusion process can be designated PPID 1 and PPID 2 as described above.

Here, PPID 1 is a program for forming an oxide layer of 3000Å in thickness, through oxidation. For its process condition, the temperature is 1,000° C., and the amount of oxygen is 8 l. PPID 2 is a program for forming an oxide layer of 800Å in the thickness. For its process condition, temperature is 900° C. and amount of oxygen is 10 l.

In the control system of semiconductor device-manufacturing process according to the aforementioned embodiment of the present invention, the main host computer 10 transfers process instructions and information therefor, such as wafer lot, to the host computer 20 so that a desired process from the previously set program such as PPID 1 or PPID 2 is performed in the diffusion furnace 30 by the operator. Here, the process instructions include a code value for the apparatus for carrying out the process and the program names PPID 1 and PPID 2 to be performed in a corresponding apparatus.

The host computer 20 transmits a PPID value and operation start instruction to a corresponding apparatus, that is, the diffusion furnace 30, referring to process instruction and information to be transmitted. Then, the diffusion furnace 30 is initialized to perform a program having a corresponding PPID value according to the operation start instruction, and then backs up the received PPID value to the host computer 20.

The host computer 20 compares the PPID value backed up from the diffusion furnace 30 with the transmitted PPID value, to judge whether they are identical or not. If the two PPID values are identical, the diffusion furnace 30 is currently set to perform a desired process. In this situation, a separate instruction is not transmitted. If the two PPID values are not the same, the diffusion furnace 30 is not ready to perform the desired process. In this case, the host computer 20 transmits a stand-by instruction to the diffusion furnace 30.

When the stand-by instruction is received from the host computer 20, the diffusion furnace 30 changes the currently set mode to the stand-by state, and stops the process. The stand-by state indicates that all the operations are stopped to wait for being reset after the, according to an operator's instruction.

Therefore, in case that a program to be performed in the diffusion furnace 30 is set inappropriately due to system or communication troubles or a software problem, operations can be interrupted, preventing false operation and waste of raw material.

A control operation for a semiconductor device-manufacturing process of the present invention will be explained below, referring to FIGS. 3, 4 and 5.

FIG. 3 is a flowchart of an operation for confirming process instructions or PPID error state performed by the main host computer 10. FIG. 4 is a flowchart of an operation for communicating information and operation for confirming PPID with the main host computer 10 and the diffusion furnace 30, in the host computer 20. FIG. 5 is a flow chart of an operation which performs a process according to a program corresponding to the PPID transmitted from the host computer 20 in the diffusion furnace 30, and backs up the received PPID to the host computer 20.

Referring to FIG. 3, the operator operates the main host computer 10 to receive a program for performing a predetermined process and wafer information. The main host computer 10 carries out step S2 to recognize the input of the process instruction performed by the operator, and performs step S4 to transfer wafer lot information and PPID information. After step S4, the main host computer 10 carries out step S6 to perform other control operations while continuously communicating with host computer 20. The main host computer 10 performs step S8 during communication with host computer 20 to confirm whether information about PPID error is input or not. The PPID error is information that, if the PPID transmitted from host computer 20 and the PPID received from diffusion furnace 30 are not the same, indicates the fact to the operator.

If the PPID error information is input from the host computer 20, step 10 is performed to output a message to inform the operator of the error. At this time, in order to output the message, one of sound message and visual message outputting methods can be set up according to a manufacturer's intention. A method of displaying a predetermined message for the PPID is desirable, because the host computer 20 usually includes a display device, and the operator confirms process control and the other process states while checking the display device.

Relating to the operation of the main host computer 10 of FIG. 3 as described above, in FIG. 4, the host computer 20 communicates with the main host computer 10 while carrying out step S12. If the wafer lot and PPID information according to step S4 of FIG. 3 is received in step S14, the host computer 20 performs step S16 to transmit the wafer lot and PPID information and the operation start instruction.

The host computer 20 performs a transfer operation in step S16, receives backed up PPID information transmitted from the diffusion furnace 30 in step S18, and carries out step S20 to judge whether the PPID information transmitted to the diffusion furnace 30 and the PPID information backed up to the host computer 20 are identical or not.

If the PPID information transmitted to the diffusion furnace 30 and the PPID information backed up to the host computer 20 are not identical, the host computer 20 performs step S22 to transfer a stand-by instruction to the diffusion furnace 30, and then carries out step S24 to transmit the PPID error message to the main host computer 10. Then, step S8 is performed in the main host computer 10.

Relating to the host computer 20 of FIG. 4, in FIG. 5, the diffusion furnace 30 communicates with the host computer 20 in step S26, and performs step S28 during communication to receive the wafer lot, PPID information and the operation start instruction, which are transmitted from the host computer 20 in step S16 in FIG. 4. If such information is received, the diffusion furnace 30 carries out an initialization set operation according to the input information. Here, the process to be performed in the diffusion furnace 30 is determined in accordance with the input PPID information. The initialization is performed to make a basis for a corresponding PPID program. After setting up the initialization, the diffusion furnace 30 performs step S30, to back up and transfer the currently set PPID information to the host computer 20. After performing step S30, the diffusion furnace 30 confirms in step S32 whether the stand-by instruction is input or not, according to whether the PPID backed up from host computer 20 is accurate or not. If the stand-by instruction is input, step S34 is performed to set up the stand-by state to stop the process, and if the stand-by instruction is not performed for a predetermined stand-by time, step S38 is performed to carry out a corresponding process.

As a result, the host computer 20 backs up information about the transmitted PPID whenever a PPID converting instruction is transmitted to the process-performing apparatus, such as the diffusion furnace 30, and compares the transmitted information with the current PPID information. Then, if they are different from each other, the host computer 20 judges that the transmission has not been performed accurately, and changes the apparatus to a stand-by state. The host computer 20 performs the comparison during the predetermined stand-by time.

Then, if a PPID error message is displayed during the control of the whole processes using the main host computer 10, the operator confirms the set state of the apparatus, and then resets the apparatus. This enables the processes to be performed accurately.

Therefore, the apparatus' process errors caused due to system error, communication and software problems can be automatically confirmed. Accordingly, the operation of the process-performing apparatus can be interrupted prior to a corresponding process, preventing poor products and quality deterioration occurring due to process error. This reduces the rate of poor products, automating system management and maximizing operation efficiency.

The present invention is not confined to the above-described embodiment but can be modified into various forms without departing from the scope and spirit of the present invention. It will be obvious to persons skilled in the art to include those modifications in the scope and spirit of the present invention.

What is claimed is:

1. A control system of a semiconductor device manufacturing system, comprising:

a main host computer for transmitting newly inputted process program information and wafer-to-be-fabricated information via a user to a following host computer, and for displaying an error message;

a host computer connected to said main host computer for receiving said newly inputted process program information and wafer information transmitted from said main host computer, for transferring said newly inputted process program information and an operation start instruction to a following process performing apparatus, for receiving back up predetermined process program information by initializing the newly inputted process program information from the process performing apparatus, for comparing the newly inputted process program information with the backed up predetermined process program information, and when said backed up predetermined process program information is different from said transmitted newly inputted process program information transferring a stand-by instruction to the following process performing apparatus and transferring an error message to the main host computer; and a process performing apparatus including a diffusion furnace and a chemical vapor depositor, respectively, connected to said host computer for receiving said newly inputted program information and an operation start instruction from said host computer, for transferring said backed up predetermined process program information to said host computer, and stopping operation if said stand-by instruction is received from said host computer and performing process if said stand-by instruction is not received from aid host computer.

2. A method of controlling a semiconductor device manufacturing system consisting of a main host computer, host computer and process performing apparatus, said method comprising the steps of:

transferring process program and wafer-to-be-fabricated information to said host computer when a user inputs them newly to said main host computer, and transmitting an operation start instruction and said newly inputted process program information to said process performing apparatus from said host computer;

backing-up predetermined process program information by initializing the newly inputted process program information from said process performing apparatus to said host computer;

judging whether said backed up predetermined process program information is identical to said transmitted newly inputted process program information in said host computer; and transmitting a stand-by instruction from said host computer to said process performing apparatus if said backed up predetermined process program information is different from said transmitted newly inputted process program information to stop said process performing apparatus, and allowing said process performing apparatus to perform its operation if said backed up predetermined process program information is identical to said transmitted newly inputted process program information.

3. The method of controlling a semiconductor device manufacturing system as claimed in claim 2, wherein when said operation stand-by instruction is output from said host computer to said process performing apparatus, and an error message is output from said host computer to said main host computer.

4. The method of a semiconductor device manufacturing system as claimed in claim 3, wherein an audible error message is generated by said main host computer when said error message from said host computer is received by said main host computer.

5. The method of a semiconductor device manufacturing system as claimed in claim 3, wherein a visual error message is displayed by said main host computer when said error message from said host computer is received by said main host computer.

* * * * *